United States Patent

[11] 3,533,496

| [72] | Inventor | Lamar T. Atwood<br>Cumberland Center, Maine |
|---|---|---|
| [21] | Appl. No. | 828,156 |
| [22] | Filed | May 27, 1969 |
| [45] | Patented | Oct. 13, 1970 |
| [73] | Assignee | Southworth Machine Company<br>Portland, Maine<br>a corporation of Maine |

[54] METHOD FOR GUIDING WHILE LONGITUDINALLY CONVEYING A REAM OF SINGLE SHEETS OF PAPER
10 Claims, 26 Drawing Figs.

[52] U.S. Cl. .................................................. 198/34,
198/174, 198/179, 93/93
[51] Int. Cl. ............................................. B65g 47/30
[50] Field of Search ........................................... 198/23, 34,
35, 168—176, 179—180; 93/93

[56] References Cited
UNITED STATES PATENTS

| 1,271,131 | 5/1872 | Wolking. |
| 410,761 | 9/1889 | Livingston et al. |
| 1,904,613 | 4/1933 | Braren. |
| 2,667,958 | 2/1954 | Malhiot. |
| 2,760,621 | 8/1956 | Crescenzo. |
| 2,815,848 | 12/1957 | Jones. |
| 2,887,212 | 5/1959 | Waite. |
| 3,084,490 | 4/1963 | Bogdanski et al. |
| 3,275,118 | 9/1966 | McCain et al. |

OTHER REFERENCES

Hayssen Manufacturing Co., Technical Bulletin 20—1—401 (Form 9—635 3m—4—67) page 3.
Pemco, Inc., Pemcomatic Model 66 Bulletin, pages 2—3.

*Primary Examiner*—Richard E. Aegerter
*Assistant Examiner*—W. Scott Carson
*Attorney*—David H. Semmes

ABSTRACT: Method for guiding and longitudinally conveying a pile of very thin objects, such as a ream of single sheets of paper, and containing the sheets laterally and longitudinally while accelerating. Particularly, captive conveyors, a method for accurately separating one object from a line of objects and moving it at a right angle to the line, by initially raising the trailing edge of the object above a horizontal conveying surface, then engaging the raised trailing edge by means of an overhead trailing edge paddle attached to a roller chain or other flexible drive, pushing the object while engaging the trailing edge with the paddle and guiding the object while pushing by means of an overhead leading edge paddle attached to another flexible drive being brought into contact with a leading edge of the object while it is being conveyed.

PUSHING
FROM BELOW

ENGAGING THE TRAILING
EDGE AND AN ADJACENT
BOTTOM SEGMENT

PUSHING THE
TRAILING EDGE

ENGAGING THE LEADING EDGE
SYNCHRONOUSLY WITH PUSHING

INVENTOR
LAMAR T. ATWOOD

BY Semmes and Semmes
ATTORNEYS

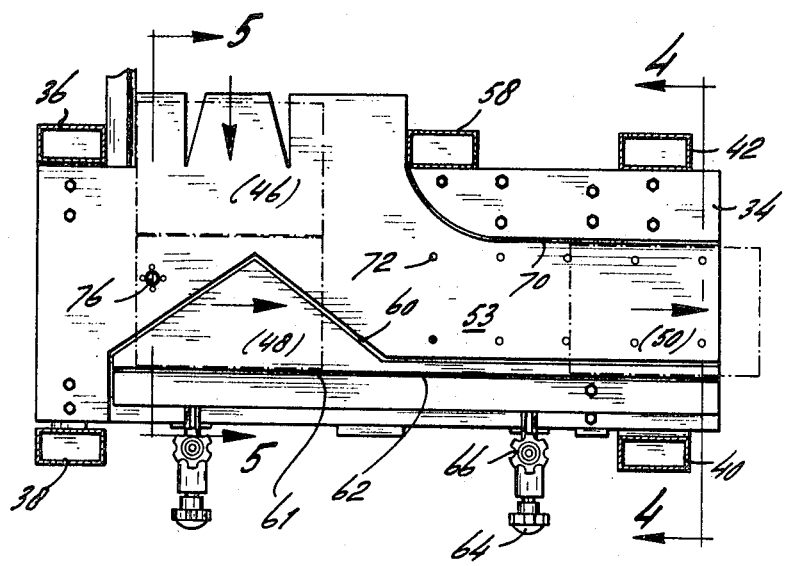
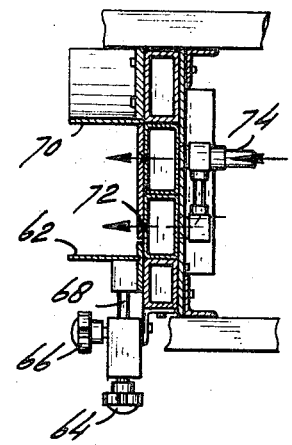
FIG. 3    FIG. 4
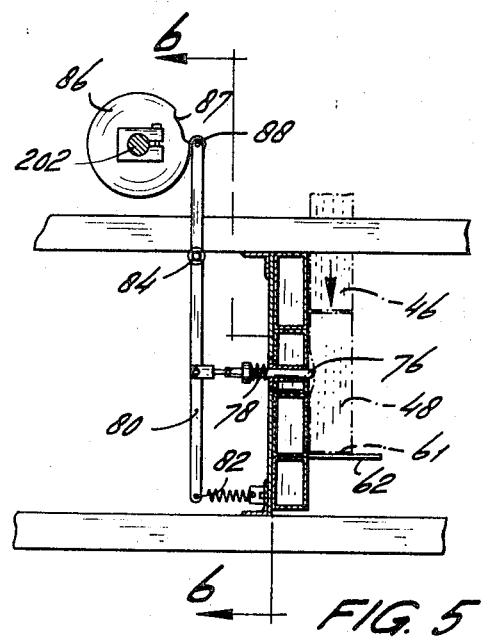
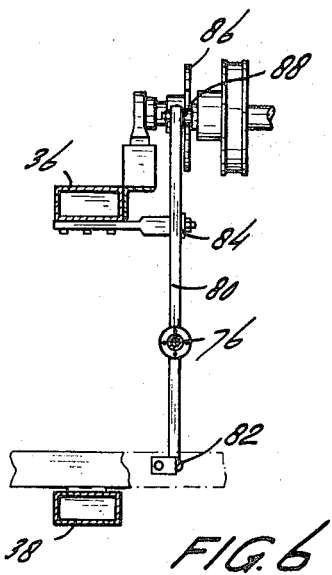
FIG. 5    FIG. 6
INVENTOR
LAMAR T. ATWOOD
BY Semmes and Semmes
ATTORNEYS

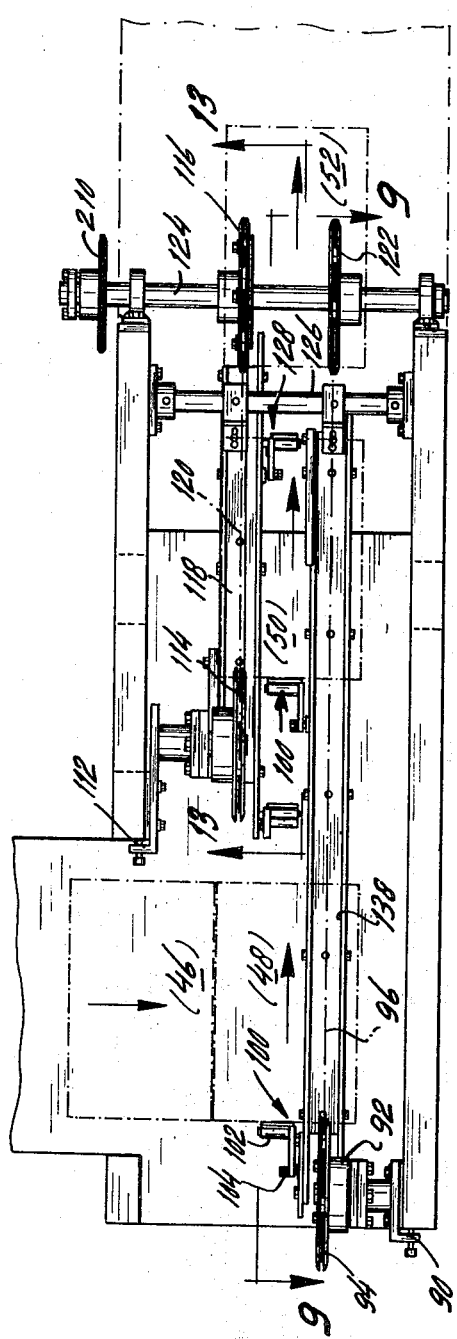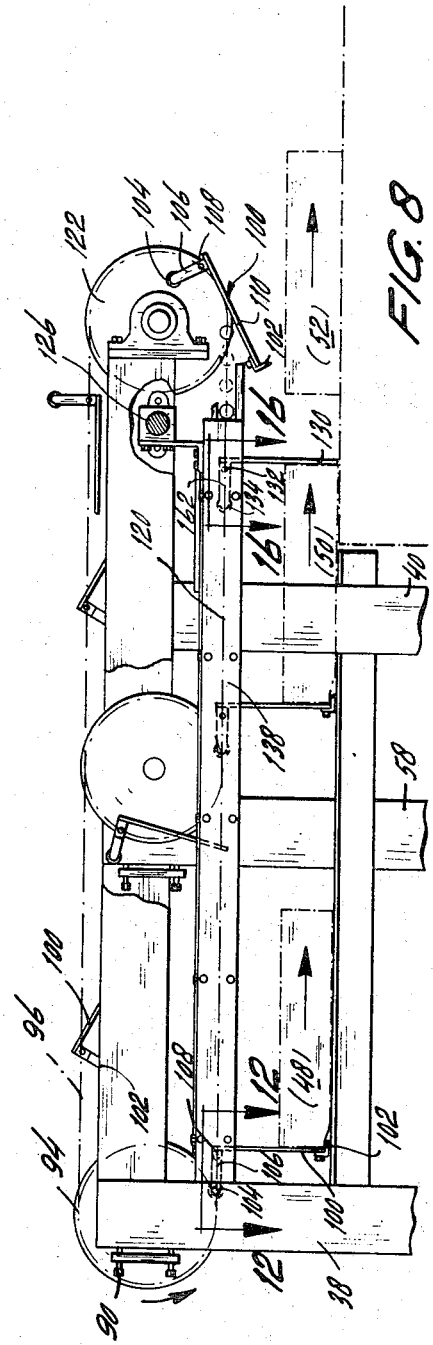

INVENTOR
LAMAR T. ATWOOD

BY Semmes and Semmes
ATTORNEYS

INVENTOR
LAMAR T. ATWOOD

BY Semmes and Semmes
ATTORNEYS

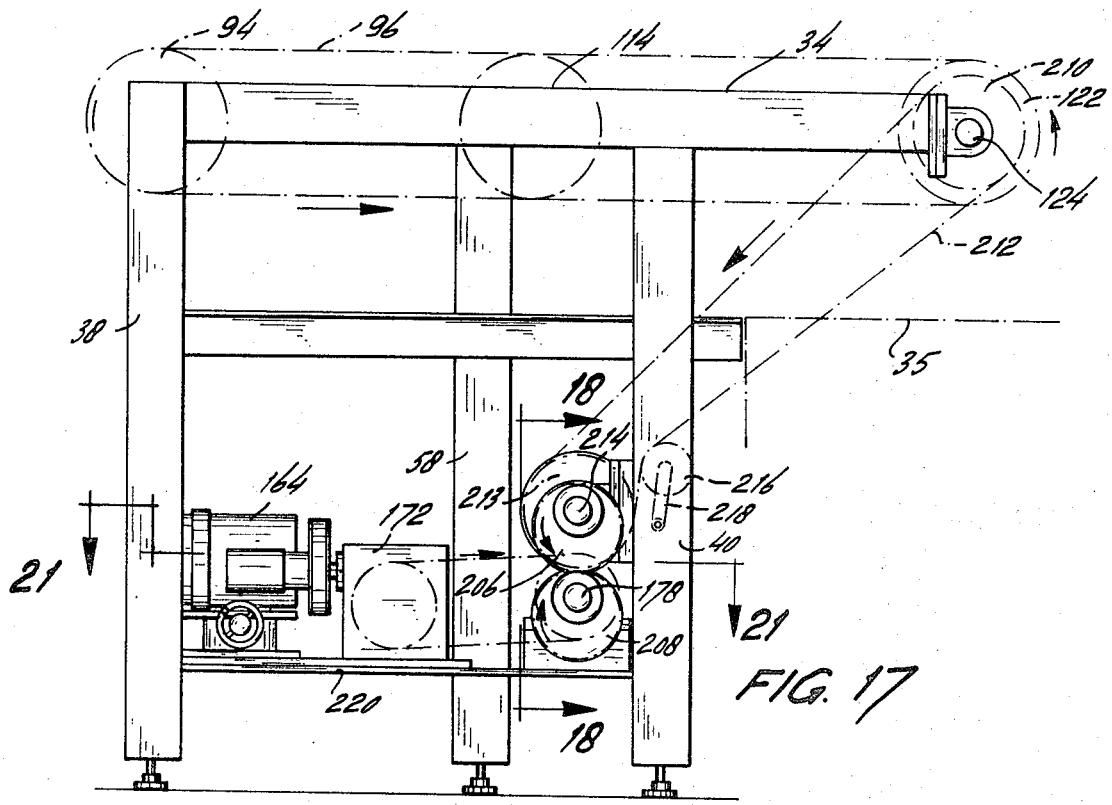
FIG. 17
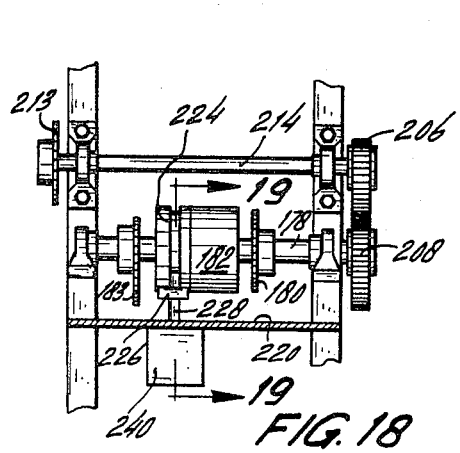
FIG. 18
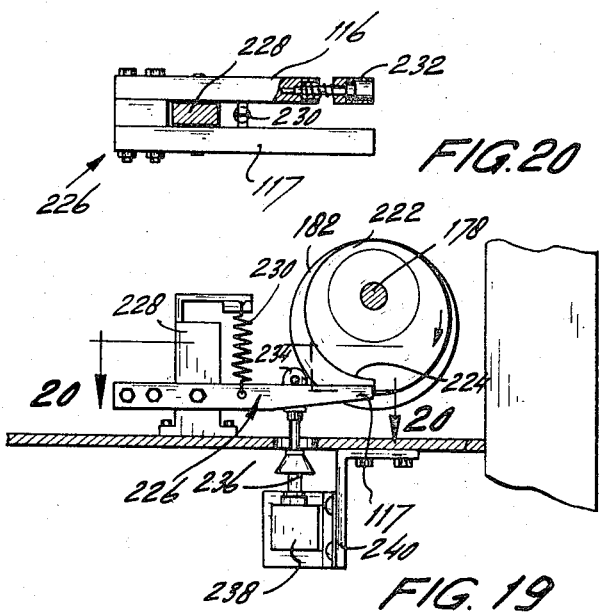
FIG. 20
FIG. 19
INVENTOR
LAMAR T. ATWOOD
BY Semmes and Semmes
ATTORNEYS

INVENTOR
LAMAR T. ATWOOD

BY Semmes and Semmes
ATTORNEYS

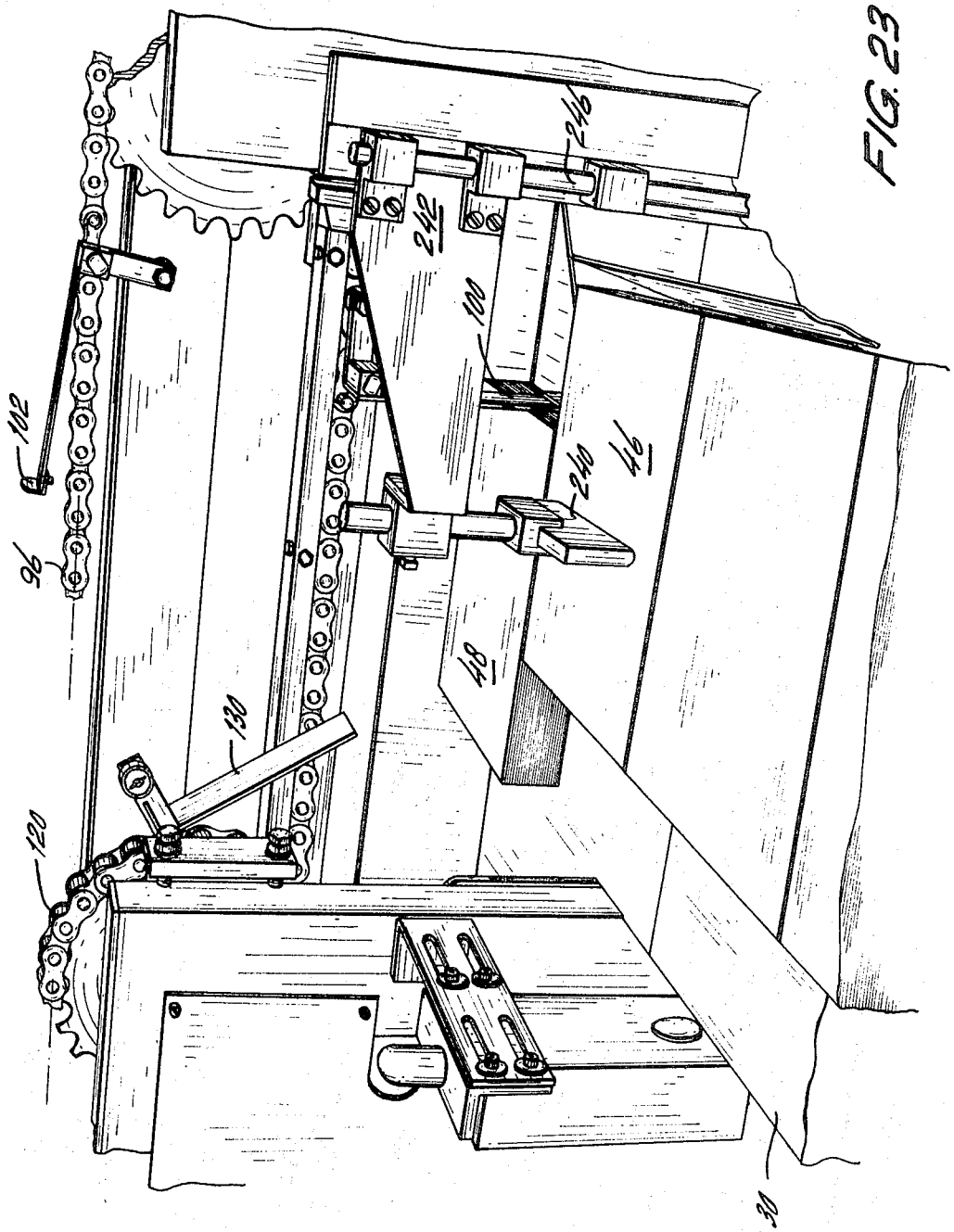

3,533,496

METHOD FOR GUIDING WHILE LONGITUDINALLY CONVEYING A REAM OF SINGLE SHEETS OF PAPER

CROSS-REFERENCES TO RELATED APPLICATIONS

METHOD OF REGISTER FEEDING (Ser. No. 808,764), filed Mar. 20, 1969, wherein there is taught a method for the surge feeding of reams of paper from a ream collecting area into the horizontal plane of a wrapping machine.

The present method concerns transfer of the reams from the surge feeding line into the wrapping machine.

BACKGROUND OF THE INVENTION

1. Field of the Invention

Separating one object such as a ream or pile of paper sheets from a line of reams is generally accomplished in a manner similar to supplying a new ball to the shooting position on a common pin ball machine and driving it out of the lead position at a right angle to the line-up of available balls. This, of course, is an over simplification of the problems associated with moving one ream of paper from a line of reams, since a plurability of thin sheets become fluid when not in total confinement.

The purpose of said separation is generally to provide for the sequential introduction of a ream of paper or other objects into a wrapping machine, each ream being delivered to the wrapping machine equally spaced and at the proper time. Rigid objects, such as bakery items, can be easily lined up and separated in the same longitudinal direction as the line; however, more fluid objects such as reams of paper gain desired confinement by having the leading edge of the leading object in a line of objects stopped by a smooth yet rigid machine member that will continue as one of the side guides when a right angle separation is employed.

2. Description of the Prior Art

The separation and feeding of one ream of paper or other piles of objects has historically been the problem of the manufacturer of the wrapper; and with slight variations wrapper manufacturers have followed the same basic method to solve this problem. A pair of roller chains fitted with vertically attached paddles or pushers that are equally spaced, receive the objects to be fed into a wrapping position by hand placement or by an interlocked mechanical means. These roller chains are usually supported on narrow rails mounted below a smooth surfaced slide table that is provided with longitudinal slits to enable the chain and paddle attachment means to have clearance to move and function with the paddle above and the chain below the table.

The introduction of a ream of paper into the path of and at right angles to the empty paddle position over the clearance slits in the slide table has called for many clever designs in order to prevent the snagging of the bottom sheets on the edges of these slits. Once this hazard has been overcome, the paddles are advanced a predetermined distance, at right angles to the line of available objects, toward the first station within the wrapper. This provides a new opening for the next object in line, and it is then pushed into position, usually by hand, where it awaits the next right angle paddle movement. As these events continue, equally spaced objects having various degrees of confinement advance toward the wrapper opening at a present rate of speed, determined by either the most efficient wrapper mechanism speed, the best average speed that the handfed infeed conveyor can be filled with new objects to be wrapped, or the supply of objects.

Typical of this paddle guides introduced from below are Hayssen Manufacturing Company Technical Bulletin 20-1-401 (Form No. 9-635 3M-4-67), page 3, wherein a back paddle only is employed and driven and accelerated by eliptical gears; also, Pemco, Inc. Pemcomatic Model 66 Bulletin, page 2 and 3. In the Pemcomatic Model 66 front and back paddles are employed but as in the Hayssen device the reams are fed by hand laterally from the side and there is no synchronization, of course, between the hand feeding and the driving.

It has long been the practice to allow the wrapper to operate at a preselected rate, without interruption, even though the spaces between infeed conveyor paddles contain objects to be wrapped or not. By using an interlocked drive and any one of several sensing devices, the flow of wrapping material is interrupted when a vacancy appears.

In order to reduce frictional damage to the surface of the object in contact with the infeed conveyor slide table, this surface is usually maintained in a very smooth and clean condition; and since an object in motion, as when pushed by a paddle, tends to remain in motion, when the paddle stops or slows down, this smooth surface requires that considerable consideration be given deacceleration and confinement means. Some wrapper manufacturers prefer to solve this problem by carefully selecting a surging conveyor drive such as provided by elliptic gears and giving no other consideration for confinement of the leading edge of the object in transit. Their reward is a relatively large loading area which is restricted only by the distance between the several pushing paddles and the two side guide plates. Others select an infeed drive that will provide for a complete stop between movement cycles; which requires that a front paddle be employed also, in order to overcome the force of inertia as the deacceleration occurs. The desired total confinement must be balanced with the loading area.

When considering the infeed and wrapping reams of paper, wrapper mechanism design speeds of operation, allow approximately 35 reams to be processed per minute, maximum. The above, listed restriction to loading and infeeding demands no higher rate and it is both accepted and unchallenged.

Prior art searching has developed the following:
  Crescenzo 2,760,621
  Jones 2,815,848
  Waite 2,887,212
  Bogdanski 3,084,490
  McCain 3,275,118

Earlier inventors have utilized overhead paddle assemblies. Note particularly both Waite and Crescenzo. However, neither of these inventors suggests the expedient of a leading paddle abutting the front of the advancing ream and none suggests a lifting device that enables the rear paddle to engage the bottom of the package being conveyed. Bogdanski and McCain are typical of the conveyor art wherein the paddles are presented from beneath the conveyor. Note also, Jones, FIG. 8 who employs a stop arm or gate 81 to engage the leading package.

SUMMARY OF THE INVENTION

According to the present method, the ream of papers is surged transversely into a horizontal conveyor plane. As the ream enters at right angles into the conveyor plane, the trailing edge bottom is lifted above the plane by pushing from below, then the trailing edge and an adjacent bottom segment are from above engaged, and pushed longitudinally. During this pushing, the leading edge of the ream is engaged synchronously from above, so as to confine the ream longitudinally while it is being advanced through the conveyor plane. Simultaneously, the ream is confined laterally so that the ream is delivered to a wrapping machine with its many, single sheets in precise, stacked relationship. In a suggested construction, practice of the method releases a conventional wrapping machine of its loading restrictions and insures faster and more reliable delivery of reams to the wrapping machine.

Principal advantages of the suggested construction include:

This invention deals only with releasing the wrapper of its loading and infeeding restrictions in order to insure reliability and surely faster production speeds.

1. It can be easily interlocked with automatic surge loading means.

2. The infeed conveyor paddles, both back and horizontal plane and front, are activated from above the feed table, leaving the plane relatively obstructed on its surface.

3. The leading or confining paddle is brought into the confining position toward the end of the first conveying cycle which provides for a "stop" and also "go" operation, or a uniform paddle velocity and a relatively large loading area. Total confinement is assured.

4. Since all infeed conveyor spaces may easily be filled, the wrapper may be interlocked with the infeed to run as required by and at a rate governed by supply of the objects to be wrapped.

5. The slide table is provided with two side guide plates; one adjustable and one fixed in position which is common practice; however, the necessary gap or slip that occurs when they are separated may have any configuration favorable to loading and infeeding motions without damage to lower objects in a pile.

BRIEF DESCRIPTION OF THE DRAWINGS

FIG. 3 is a top plan thereof with the overhead paddle guide mechanism removed;

FIG. 4 is a vertical section, taken along section line 4–4 of FIG. 3;

FIG. 5 is a transverse section, taken along section line 5–5 of FIG. 3;

FIG. 6 is a top plan of the mechanism for pushing the trailing edge upwardly;

FIG. 7 is a top plan showing the overhead paddle guide assembly engaging a ream (illustrated in phantom);

FIG. 8 is side elevation of the device, showing overhead engaging of the trailing edge and leading edge of the advancing ream;

FIG. 17 is a side elevation of the conveyor drive mechanism shown in phantom, showing the elliptical surging sprocket;

FIG. 18 is a fragmentary section, taken along section line 18–18 of FIG. 17 and showing the stop guide indexing mechanism;

FIG. 19 is a transverse section, taken along section line 19–19 of FIG. 18;

FIG. 20 is a transverse section, taken along section line 20–20 of FIG. 19;

FIG. 23 is a perspective view showing the surge feeding ream stop device holding a leading ream in place, as the overhead paddles guide and convey away an earlier fed ream.

DESCRIPTION OF THE PREFERRED EMBODIMENTS

In FIG. 1 there is schematically illustrated the steps for guiding and conveying a ream of paper, according to the present invention; and in FIGS. 2–22 there is illustrated a suggested apparatus for carrying out the method.

Figure 1A:
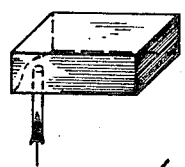
FIGS. 1A, 1B, 1C, and 1D are schematic views of the steps taken according to the present method of guiding and conveying a ream of paper.
Figure 1B:
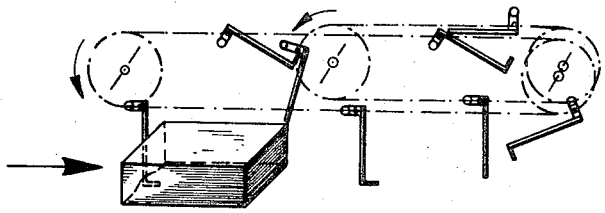
Figure 1C:
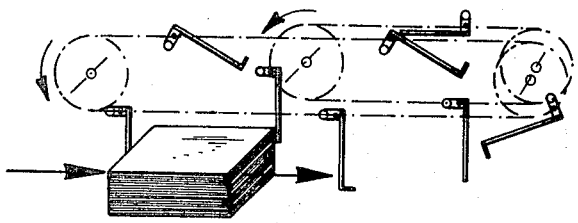
Figure 1D:
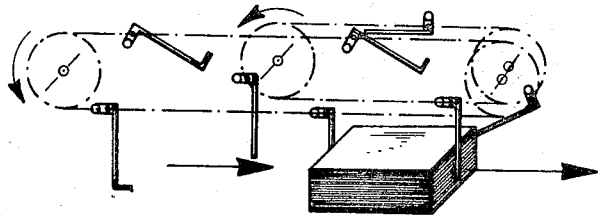
Figure 2:
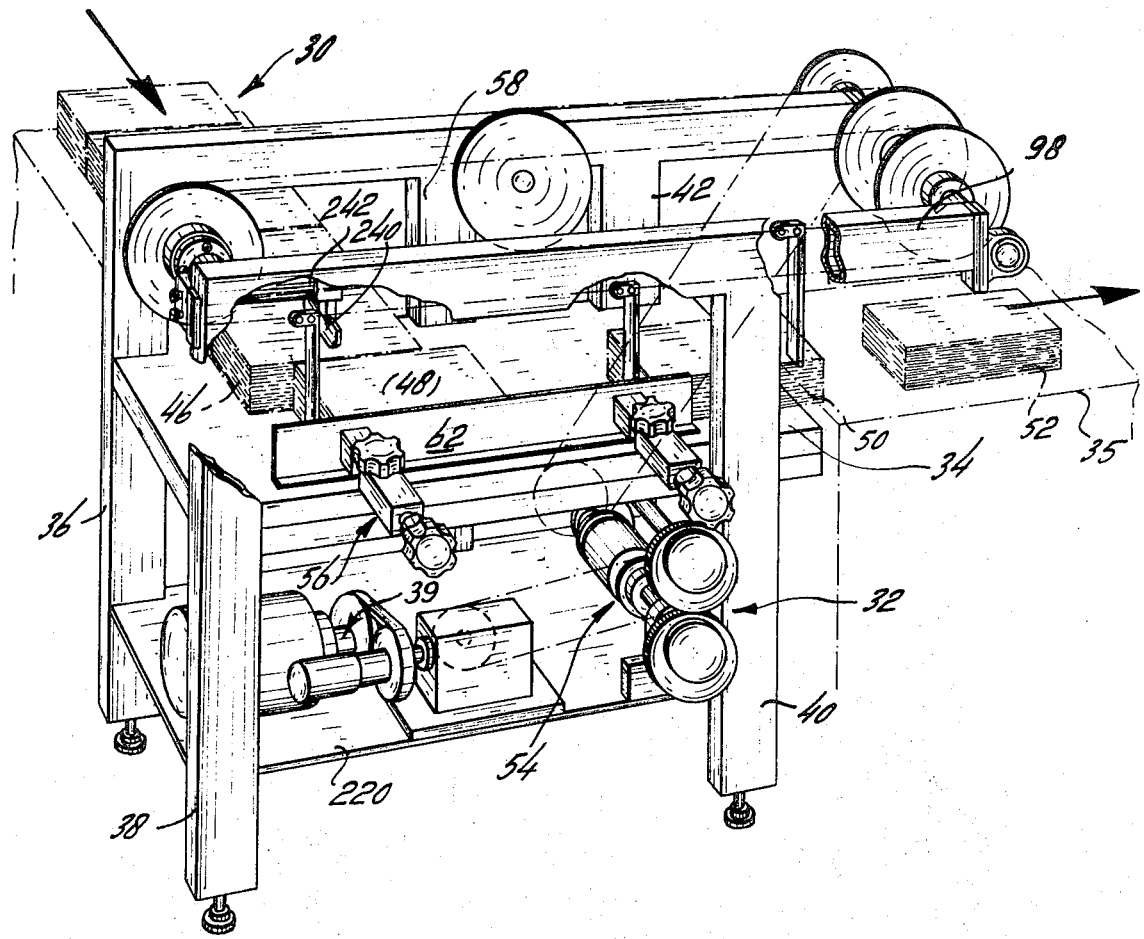
FIG. 2 is a perspective view of a proposed conveyor assembly, positioned adjacent a register feed device.

In FIG. 2 a register feeding device 30 of the type disclosed in applicant's earlier filed application entitled Method of Register Feeding, Ser. No. 808,764. filed Mar. 20, 1969 is illustrated as surge-feeding a plurality of sequentially aligned reams of paper transversely into guiding and conveying device 32, supporting a horizontal conveying plate 34, and into commercial wrapper system 35.

The proposed guiding and conveying device 32 is comprised of upstanding legs 36, 38, 40, 42, and 58 supporting top conveyor plane plate 34 and bottom plate 220 on which are mounted motor drive 39, paddle guide system 56 and surge-feeding drive mechanism 54.

In FIG. 3 horizontal plate 34 is illustrated as comprised of plow turn sector 53, having a dihedral plow channel 60 axially aligned with the approaching ream 46 and a plurality of air holes 72 fed by air conduits 74 so as to lift the reams as they are being guided and conveyed longitudinally. A stationary vertical guide plate 70 is positioned at one side of plate 34 and an adjustable vertical plate 62 movable upon identical pistons 68 may be set to the paper size by means of piston knob 64 and set screw knob 66.

A vertical pushing pin 76 is illustrated in FIGS. 5 and 6. Pin 76 is urged away from the ream bottom by means of spring 78 and is connected to pushing rod 80 pivoted as at 84 and having at one end roller 88, engaging cam 86 and at the other end being tensioned by means of spring 82. As illustrated in FIG. 5, roller 88 contacting cam concavity 87, causes spring 82 to urge plunger 76 upwardly to push the underside of the ream 48. This action permits engagement of the trailing edge of the ream and engagement of the adjacent bottom segment by the overhead paddle 100 and its tab 102, as particularly illustrated in FIG. 8. According to applicant's method the lead ream 48 is surged from feeding area 30 into the plow area, so that the ream side 61 abuts adjustable baffle 62. The trailing ream 46 is held in place by the surge feeding plate 240, as ream 48 arrives at baffle 62. Plate 240 is secured to overhead arm 242, reciprocably supported by upper arm 246, FIG. 23.

As pin 76 pushes upwardly, the overhead paddle tab 102 engages the bottom of the ream, as illustrated in FIG. 8. The overhead paddle guide trailing edge drive consists of chain 96 mounted upon sprockets 94 and 122. Sprocket 94 may be mounted upon a shaft set in adjustable bracket 90 affixed to leg 38. As illustrated in FIGS. 7, 8, 9, and 10, the overhead paddle guide includes a chain guiding mechanism 138, illustrated in FIG. 9. Shaft 126, bracket 136 and support guide 138 which consists of top chain guide track 140 and bottom plate 146 which supports bottom chain guide track 142. This construction is particularly illustrated in FIG. 11.

Figure 12:
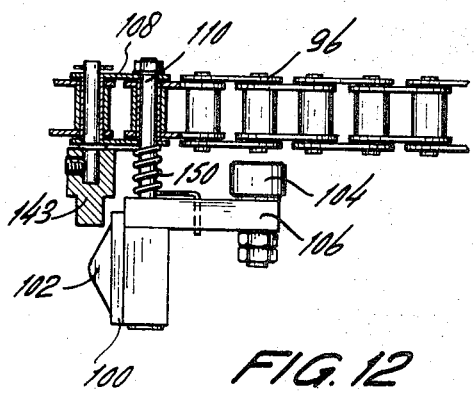
FIG. 12 is fragmentary section, taken along section line 12–12 of FIG. 8.
Figure 13:
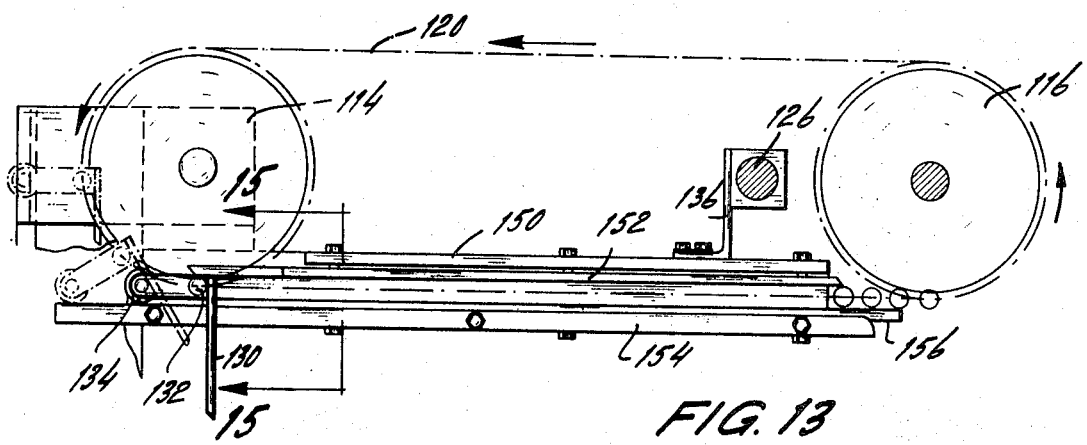
FIG. 13 is a longitudinal section, taken along section 13–13 of FIG. 7 and showing the forward edge abutting paddle conveyor system.
Figure 14:
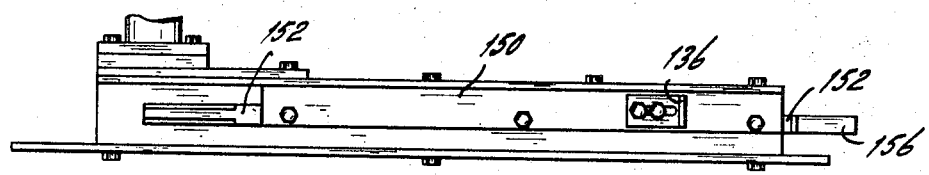
FIG. 14 is a top plan of the guide for the forward edge system.

As illustrated in FIG. 12, the trailing edge vertical paddle 100 is pivoted to the chain link 108 by means of shaft 110, including torsion spring 150 extending from shaft 110 to engage arm 106 which at its outer extremity has guide roller 104. Paddle 100 extends downwardly from shaft 110 to support ream bottom tab 102.

Figure 9:
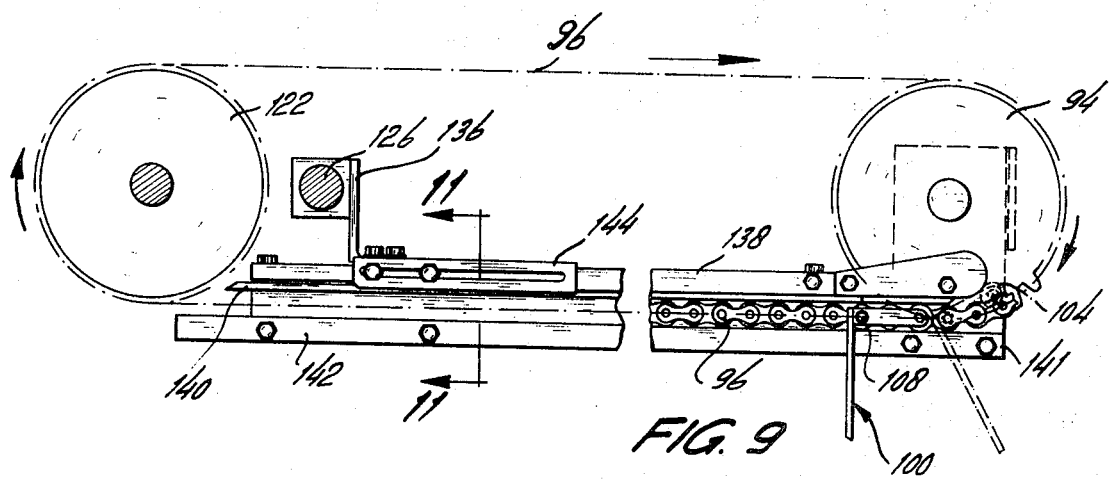
FIG. 9 is a longitudinal section, taken along sections line 9–9 of FIG. 7, showing the leading edge abutting paddles.
Figure 10:
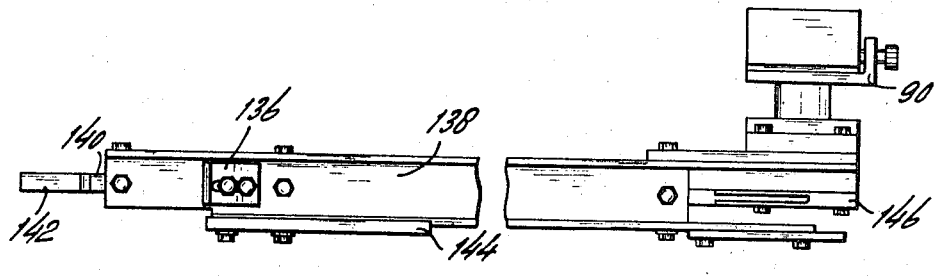
FIG. 10 is a top plan of the overhead paddle guide assembly illustrated in FIG. 9.
Figure 11:
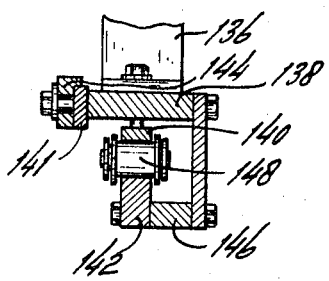
FIG. 11 is a transverse section, taken along section 11–11 of FIG. 9.

As illustrated in FIGS. 9 and 11 guide roller 104 engages plate 141 resisted by spring 150 as the chain passes through the bottom guide. This aligns and holds the paddle guide 100 at right angles to the ream being conveyed. As illustrated in FIG. 8, at the end of the overhead guide assembly, as paddle 100 leaves ream 52, it is pivoted away from the ream by torsion spring when roller 104 leaves plate 141.

The overhead leading edge guide is illustrated also in FIGS. 7, 8, and 13—16 and consists of chain 120 (illustrated in phantom) driven about sprocket 114 and sprocket 116. Sprocket 116 is fitted along with sprocket 122 upon shaft 124, driven by end sprocket 210 which has chain 212 extending to drive sprocket 213 on lower shaft 214 illustrated in FIG. 17.

Figure 15:
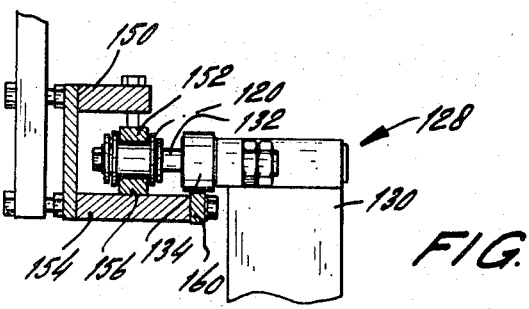
FIG. 15 is a transverse section, taken along section line 15–15 of FIG. 13.
Figure 16:
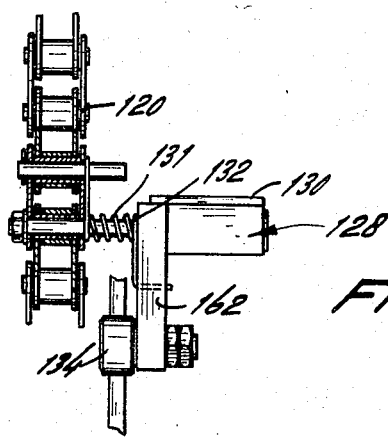
FIG. 16 is a transverse section, taken along section 16–16 of FIG. 8.

The leading edge paddle guides 128 are similar in construction to the trailing edge guides, but have eliminated the ream bottom engaging tab 102. The leading edge guide consists of plate 130 pivoted to the chain shaft 132 and having a guide roller 134 at the end of arm 162. The leading edge overhead guide includes a top plate 150 supported by bracket 136 and supporting top chain guide track 152 and bottom chain guide track 156 engaging the chain links, as illustrated in FIG. 15. Simultaneously, roller 134 engages outer track 160 so as to hold paddle 130 at right angles to the ream. In FIG. 16, plate 130 is shown affixed to arm 162 extending from shaft 132 to roller 134.

The paddle guide drive assembly and its coordination with the register feed surging device are illustrated in FIGS. 17--22. Motor 164 is supported upon lower plate 220, so as to drive pulley 166 extending via belt 170 to commercial variable diameter pulley 167 attached to gear reduction mechanism 168. Sprocket 174 extends from reduction mechanism 168 and supports chain 176 which extends to drive sprocket 180 mounted upon a commercial single revolution clutch supported by shaft 178 and identical brackets 177 at both sides of plate 220.

Surge-feeding drive mechanism 54, FIGS. 2, 18, 19 and 21, drives and coordinates all movable numbers of the preferred embodiments, including the unit of the earlier referenced application (Ser. No. 806,764) partially shown as 30, FIGS. 2 and 23, by allowing for the rotation of shaft 178, FIGS. 17, 18 and 21 a single rotation of 360°,when called upon by the earlier referenced wrapper 35, FIGS. 2 and 17. An electric signal from the wrapper 35 causes solenoid plunger 236, FIG. 19 to be pulled in toward solenoid 238, therefore pulling on the attached swing bolt 234 which in turn withdraws trip lever assembly 226 from engagement with positive stop cam 111 and with trip cam 224, an integral part of single-revolution clutch 182, while opposed by spring 230. Since cam 224 is rigidly attached to shaft 178 and frictionally attached to drive sprocket 180 through clutch 182, rotation of shaft 178 is allowed in a clockwise direction, FIG. 19. The electric signal that disengaged trip lever assembly 226, FIGS. 19 and 20, by plan is discontinued just as soon as solenoid plunger 236 is drawn within the core of solenoid 238 allowing trip lever assembly 226 to ride along the surface of trip cam 224 and positive stop cam 111 which is rigidly attached to shaft 178. Spring force from 230 insures this surface contact. As a single revolution of 360° progresses, the surfaces of the two cams are gradually lowering the ends of trip lever 117 and compression spring loaded cap 232 on positive stop bar 116 into path of the oncoming vertical surfaces of cams 224 and 111. By radial spacing, cam 224 engages lever 117 first and initiates the opposition to the frictional forces that rotate clutch housing 182. This will normally disengage the internal members that provide the frictional force; however, if it does not, continued rotation will allow an engagement of positive stop cam 111 to come in contact with positive stop lever 116 and rotation stops.

The above-described single revolution is required to drive a register feed device 30 and a guiding and conveying device 32, FIG. 2 into a wrapping system 35, one object or ream of paper at a time on demand from wrapper 35, by initially moving the reams slowly so as not to disturb their stacking and accelerating up to a maximum speed to a sudden stop. This slow movement at the beginning also allows the side plates 62 and 70, FIG. 3, to realign the side edges and the sudden stop against paddle 130 by ream (50) FIG. 8 realign the front edges.

Figure 21:
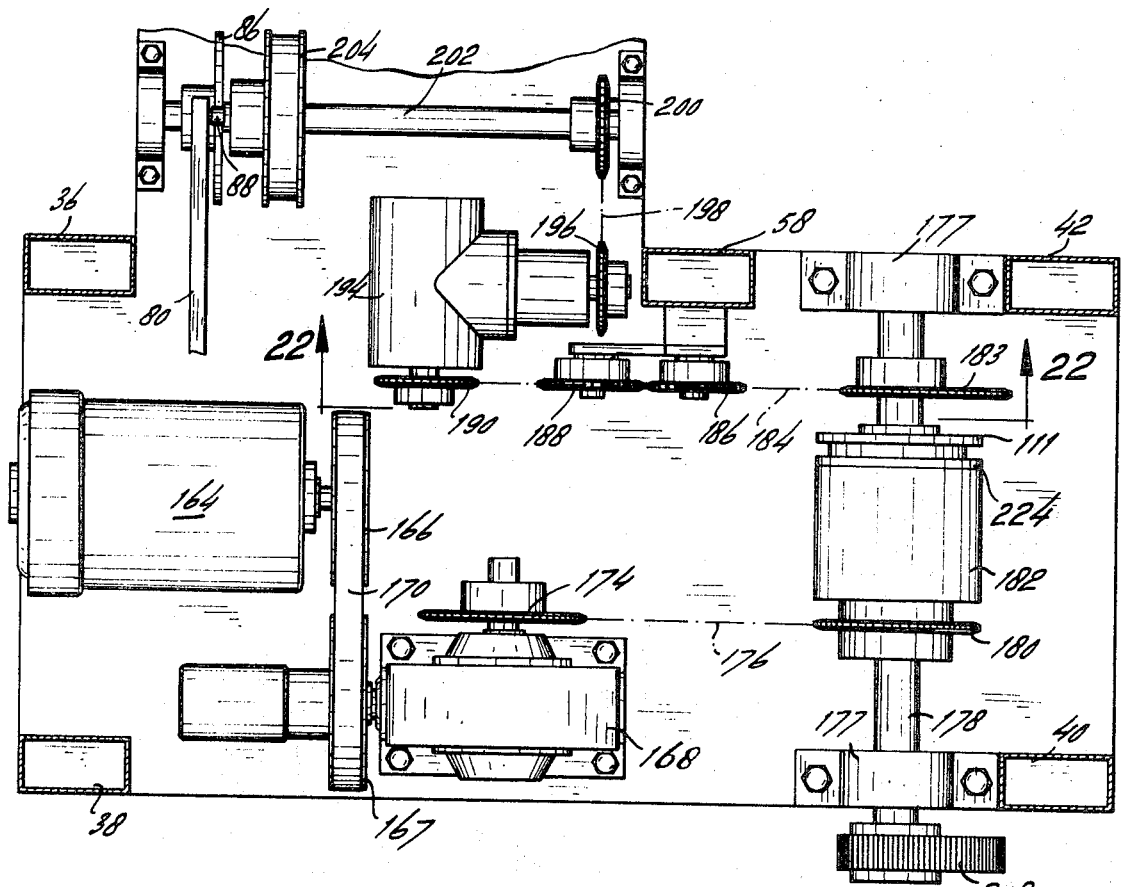
FIG. 21 is a transverse section, taken along section line 21–21 of FIG. 17.
Figure 22:
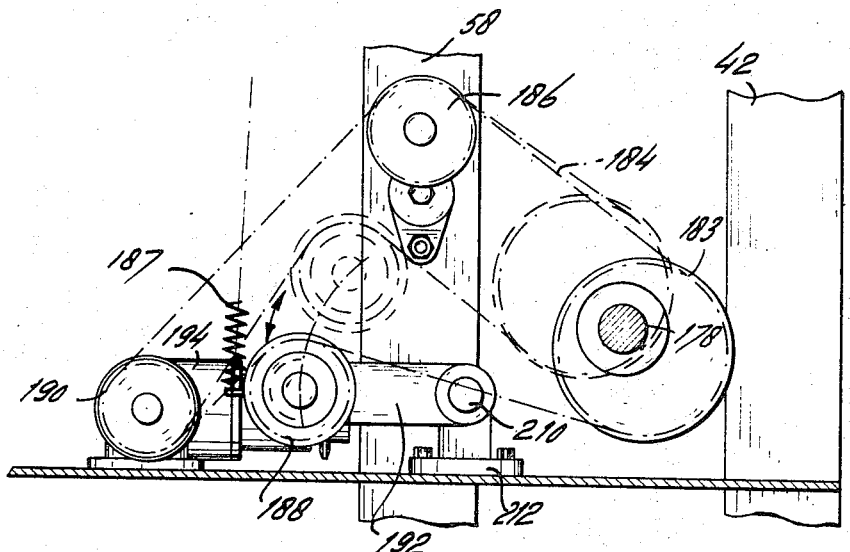
FIG. 22 is a transverse section of the elliptical drive mechanism for surging the register feed device, taken along section line 22–22 of FIG. 21.

To provide for a smooth accelerating drive for the register feed device, eccentric sprocket 183 (mounting hole off true center) is affixed to shaft 178, FIGS. 21 and 22. Sprocket 183 supports chain 184 (illustrated in phantom) which extends around idler sprocket 186, sprocket 190, supported in right angle transmission 194, then above sprocket 188 mounted upon arm 192, pivoted as at 210 in lug or bracket 212. As chain 184 is effectively foreshortened, spring 187 pivots arm 192 upwardly, so as to compensate for the eccentric action of sprocket 183, maintaining chain 184 taunt. This accelerating drive is connected to shaft 202, through transmission 194 by sprockets 196 and 200 by chain 198, which further drives and coordinates the motions of the register feed device 30 through pulley 204 and ream pushing or lifting pin 76, FIG. 5 activated by cam 86 also attached to shaft 202.

To provide for a smooth accelerating drive for the overhead paddle sprockets 122 and 116, FIGS. 7 and 17, elliptic gear 208 attached to shaft 178 is meshed with and drives elliptic gear 206 mounted on shaft 214, FIG. 18. Sprocket 213 on shaft 214 drives sprocket 210 on shaft 124 that supports and drives sprockets 122 and 116. Elliptic gears 206 and 208, when properly aligned will provide a relatively slow engaging speed for the back or trailing edge paddle 100, FIG. 8 and uniformly increase speed as the initial portion of the single revolution progresses. The position of gears 206 and 208, as shown by FIG. 17, is the desired radii relationship for introduction of paddle 100, FIG. 8 to ream 48.

Manifestly, variously configured overhead paddle guide assemblies may be employed without departing from the spirit of invention. Likewise a direct drive from a wrapping or boxing unit to shaft 178 could eliminate the need of clutch 182 and drive motor 164.

I claim:
1. Method for guiding while longitudinally conveying an object in a horizontal plane comprising:
   A. pushing said object from below, so as to lift its bottom trailing edge above said plane;
   B. simultaneously engaging said trailing edge and an adjacent bottom segment of said object;
   C. pushing said trailing edge, so as to longitudinally advance said object in said horizontal plane; and
   D. sequentially engaging the leading edge of said object synchronously with said pushing, so as to longitudinally confine said leading and trailing edges while conveying said object.

2. Method for guiding while longitudinally conveying a ream of sheets of paper in a horizontal plane comprising:
   A. pushing said ream of sheets of paper from below, so as to lift its bottom trailing edge above said plane;
   B. simultaneously engaging said trailing edge and an adjacent bottom segment of said ream of sheets of paper;
   C. pushing said trailing edge, so as to longitudinally advance said ream of sheets of paper in said horizontal plane; and
   D. sequentially engaging the leading edge of said ream of sheets of paper synchronously with said pushing so as to longitudinally confine said leading and trailing edges while conveying said ream of sheets of paper.

3. Method for guiding while longitudinally conveying a ream of sheets of paper as in claim 2, including laterally confining while conveying said ream in said horizontal plane.

4. Method for guiding while longitudinally conveying a ream of single sheets of paper as in claim 2, including initially surging said ream of paper transversely into said plane prior to pushing.

5. Method for guiding while longitudinally conveying a ream as in claim 2, including accelerating pushing of said ream after engaging said leading and trailing edges.

6. Method for guiding while longitudinally conveying a ream of papers as in claim 5, including stopping surging of said lead ream into said horizontal plane transversely, except as the area of said horizontal plane opposite said feeding area is vacant.

7. Method for guiding while longitudinally conveying a ream of sheets of paper as in claim 2, wherein said pushing of said trailing edge and engaging of said leading edge is from above said plane.

8. Method of register feeding and guiding a plurality of longitudinally aligned reams of paper comprising:
   A. advancing said reams into a collecting area having a receiving end and a feeding end;
   B. surging said reams within said collecting area by frictionally engaging said reams from beneath, so as to advance said reams from said receiving end towards said feeding end; while C. pushing downwardly onto a leading one of said reams within said feeding end, so as to stop advancing of said leading one and sequentially abutting objects; then D. temporary releasing of said pushing downwardly, while surging so as to surge said leading ream through said feeding end and transversely onto a horizontal plane;

E. reapplying said pushing as the next abutting ream enters said feeding area;

F. pushing said leading ream of sheets of paper from below, sequentially of surging through said feeding area, so as to lift its bottom trailing edge above said plane;

G. simultaneously engaging said trailing edge and an adjacent bottom segment of said ream of sheets of paper;

H. pushing said trailing edge, so as to longitudinally advance said ream of sheets of paper in said horizontal plane; and I. sequentially engaging the leading edge of said ream of sheets of paper synchronously with said pushing, so as to longitudinally confine said leading and trailing edges while conveying said ream of sheets of paper.

9. Method for register feeding and guiding as in claim 8, including pushing of said ream from below sequentially with the surging of said object transversely into said plane.

10. Method of register feeding and guiding as in claim 8 wherein said pushing of said trailing edge and engaging of said leading object is from an end above said horizontal plane.